United States Patent [19]

Shepard et al.

[11] Patent Number: 4,881,830
[45] Date of Patent: Nov. 21, 1989

[54] SPLIT RING ROLLER BEARING CAGE

[75] Inventors: Richard W. Shepard, Torrington; Earle Corban, Winsted, both of Conn.; Peter Preston, Oshkosh, Wis.

[73] Assignee: The Torrington Company, Torrington, Conn.

[21] Appl. No.: 304,137

[22] Filed: Jan. 31, 1989

[51] Int. Cl.⁴ .............................................. F16C 33/46
[52] U.S. Cl. .................................... 384/577; 384/523; 384/572
[58] Field of Search ............................ 384/572–580, 384/523, 526

[56] References Cited

U.S. PATENT DOCUMENTS

| 3,199,935 | 8/1965 | Pitner | 384/573 |
| 3,305,279 | 2/1967 | Zimmerer | 384/580 X |
| 4,239,304 | 12/1980 | Wakunami | 384/573 |
| 4,475,777 | 10/1984 | Hofmann et al. | 384/572 |

FOREIGN PATENT DOCUMENTS 1380454  1/1975  United Kingdom ............... 384/572

Primary Examiner—Thomas R. Hannon
Attorney, Agent, or Firm—Frank S. Troidl

[57] ABSTRACT

The annular split cage is made of two semicircular parts. Each part has roller pockets containing one or more rollers. The cross-sectional area of the end rims of each semicircular part decreases from the circumferential center of the end rim to each circumferential end of the end rim.

4 Claims, 2 Drawing Sheets

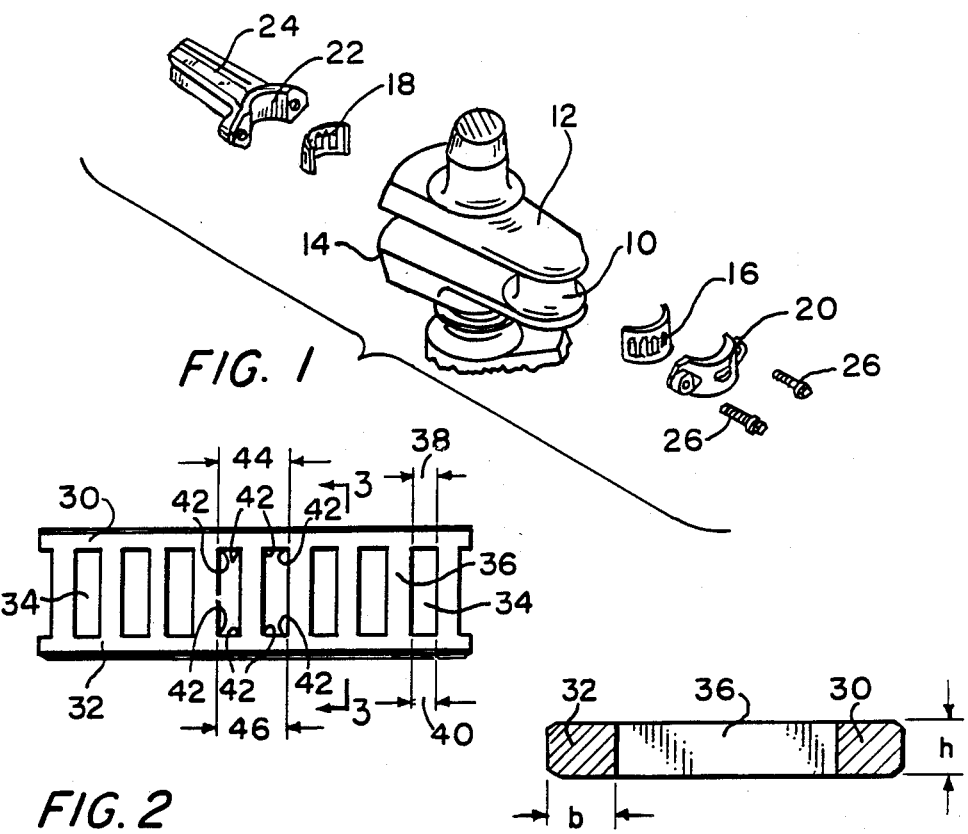
FIG. 1
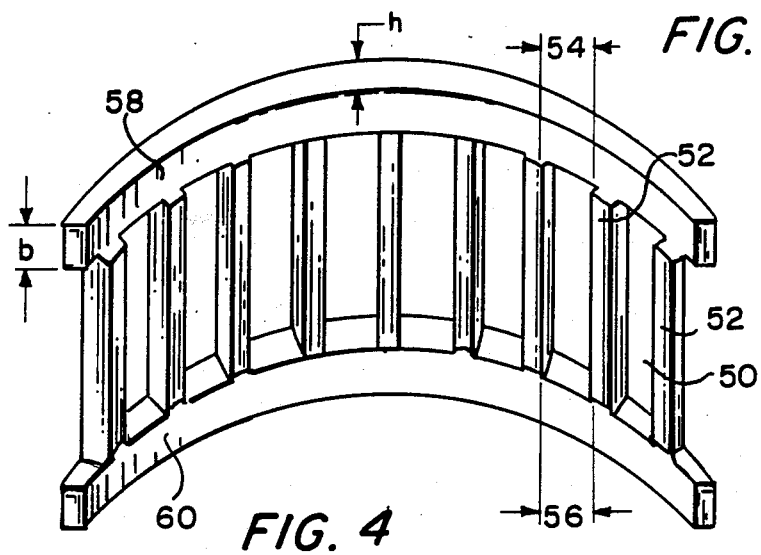
FIG. 2
FIG. 3
FIG. 4

SPLIT RING ROLLER BEARING CAGE

This invention relates to bearings. More particularly, this invention is a novel annular split roller cage.

The split cage is necessary where the structure of the part on which the cage is to be mounted is such that it is impossible, or very difficult, to install a one-piece full circle cage. As a specific example, a crank pin bearing is used between the part of a crankshaft called the crank pin and the end of the connecting rod opposite a piston. Often, the crankshaft is a solid piece and a one-piece full circle bearing or cage cannot be installed. The bearing used is a roller type with the rollers spaced by a cage. The cage must be split into at least two parts to allow an installation on the crank pin.

The split cages are subjected to a complex system of forces when the engine is operating. The result of the forces acting on the split cage is often a failure of the cage. Cage failures occur after hours of operation at speeds that indicate hundreds of thousands of cycles were completed before failure occurred. The failures tend to occur in the same area on the cages. A fatigue failure occurs in the designated area because the stresses there exceed the endurance limit of the cage material.

It is impossible to reduce the forces on the cages because these are caused by the engines in which the bearings are used. However, it is possible to reduce the stresses at given areas on the cages by changing the structure of the cage. This invention is a new split roller cage which reduces the stresses at those areas where failures occur using conventional cages.

Briefly described, the annular split cage comprises two semicircular parts, with each semicircular part having a plurality of circumferentially separated generally rectangular roller pockets defined by circumferentially separated crossbars and circumferential portions of a pair of axially separated end rims. The cross-sectional areas of the circumferential middle of said circumferential portions of the end rims decrease from the circumferential center of the end rims to each circumferential end of the end rims.

The invention, as well as its many advantages, may be further understood by reference to the following detailed description and drawings in which:

FIG. 1 is a perspective view showing a preferred embodiment of the annular split cage mounted about the crank pin of a crank shaft;

FIG. 2 shows a conventional split cage portion, with the cage unwrapped or flattened;

FIG. 3 is a view taken along lines 3—3 of FIG. 2;

FIG. 4 is a perspective view showing a first preferred embodiment of the invention;

In the various figures, like parts are referred to by like numbers.

Figure 5:
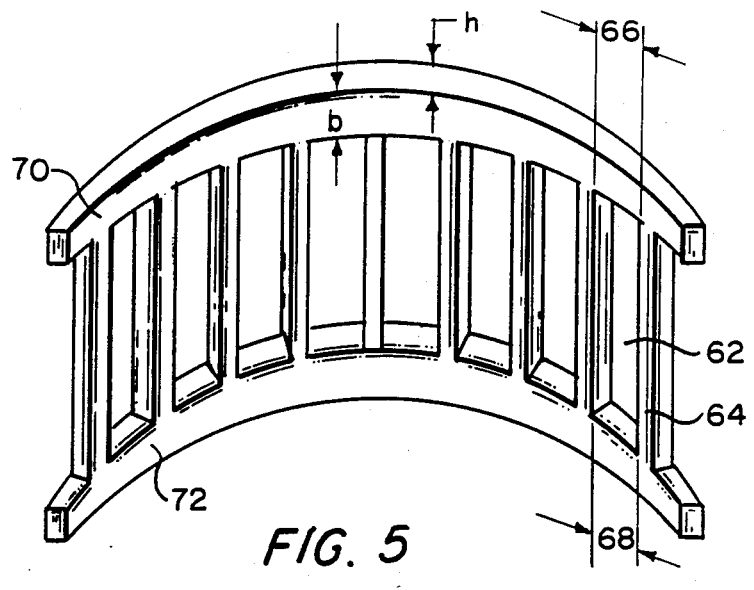
FIG. 5 is a perspective view showing a second preferred embodiment of the invention.

Referring to the drawings and particularly to FIG. 1, a crank pin 10 extends between and is supported by the axially separated plates 12 and 14. The two semicircular split cage parts 16 and 18 are wrapped about the crank pin 10. The semicircular part 16 fits within a connecting rod cap 20 which serves as the outer race for the rollers in part 16; the semicircular split cage part 18 fits within a curved surface 22 of the connecting rod 24. The curved surface 22 serves as the outer race for the rollers contained within the split cage part 18. The crank pin 10 serves as the inner race for the rollers contained in both part 16 and part 18. A pair of bolts 26 are fed through threaded holes in the connecting rod cap 20 and the crankshaft 24 to mount the semicircular parts 16 and 18 about the crank pin 10.

Referring to FIG. 2 and FIG. 3, each semicircular part has a pair of axially separated end rims 30 and 32. A plurality of circumferentially separated generally rectangular roller pockets 34 are defined by circumferentially separated crossbars 36 and the circumferential portions 38 and 40 of the end rims 30 and 32 respectively.

Most of the material failures occur at the corners 42 of those pockets located at the circumferential centers 44 and 46 of the end rims 30 and 32 respectively.

Referring to FIG. 3, there is a basic formula which is:

$$\text{Stress} = \frac{M}{\frac{bh^2}{6}}$$

where M = bending moment
b = the axial length of the end rim
h = the radial length of the end rim The stress is thus reduced for any given load M if either b or h are increased and increasing h is more effective.

The space available for increasing b and h is limited by the crankshaft and connecting rod structure. It is not desireable to make b and h larger. Shorter rollers would allow a larger b but capacity would suffer. Also, making b and h larger would lead to heavier cages which would cause greater loads. Fortunately, a solution does not require reduction of the stress in the overall, cage—only in the center sections 44 and 46 of end rims 30 and 32, respectively. Thus, we can arrive at a heavier circumferential center section in the rims by thinning the ends of the rims.

In the embodiment of FIG. 4, each semicircular part of the split cage has a plurality of circumferentially separated pockets 50 defined by the circumferentially separated crossbars 52 and circumferential portions 54, 56 of a pair of axially separated end rims 58 and 60, respectively.

The axial length, b, of each end rim is constant. The radial length, h, of each end rim decreases from the circumferential center of the end rim to each circumferential end of the end rim.

In the embodiment of FIG. 5, the semicircular parts have a plurality of circumferentially separated generally rectangular pockets 62 defined by circumferentially separated crossbars 64 and circumferential portions 66 and 68 of a pair of axially separated end rims 70 and 72, respectively. The radial length, h, of each end rim 70 and 72 is constant and the axial length, b, of each end rim 70 and 72 continuously decreases from the circumferential center of the end rims to each circumferential end of the end rims.

Figure 6:
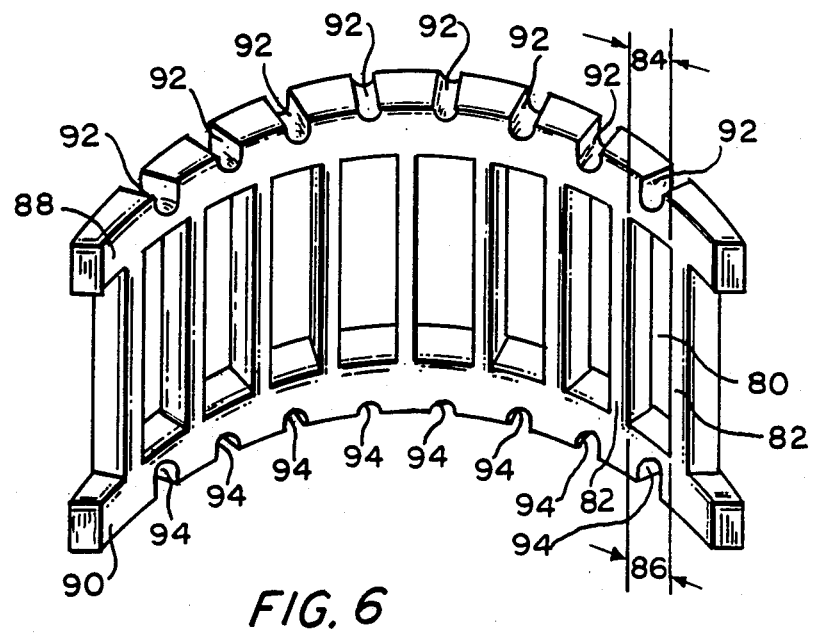
FIG. 6 is a perspective view showing a third preferred embodiment of the invention.

In the embodiment of FIG. 6, the semicircular parts of the annular split cage each have a plurality of circumferentially separated generally rectangular roller pockets 80 defined by circumferentially separated crossbars 82 and circumferential portions 84 and 86 of a pair of axially separated end rims 88 and 90, respectively. A notch 92 is formed at the middle of each circumferential portion 84 of the end rim 88. A notch 94 is formed at each circumferential portion 86 of the end rim 90. The depths of the notches increase from the circumferential center of each end rim to each circumferential end of the end rims.

We claim:

1. An annular split cage comprising: two semicircular parts, each semicircular part having a plurality of circumferentially separated crossbars interconnecting a pair of axially separated end rims to form a plurality of circumferentially separated pockets; each end rim having circumferential ends and a circumferential center portion located the same circumferential distance from each circumferential end, the cross-sectional areas of the end rims decreasing from the circumferential center portion of the end rims to each circumferential end of the end rims.

2. An annular split cage in accordance with claim 1 wherein the axial length of each end rim is constant and the radial length of each end rim continuously decreases from the circumferential center portion of the rim to each circumferential end of the end rims.

3. An annular split cage in accordance with claim 1 wherein the radial length of each end rim is constant and the axial length of each end rim continuously decreases from the circumferential center portion of the end rim to each circumferential end of the end rims.

4. An annular split cage comprising: two semicircular parts, each semicircular part having a plurality of circumferentially separated crossbars interconnecting a pair of axially separated end rims to form a plurality of circumferentially separated pockets; each end rim having circumferential ends and a circumferential center portion located the same circumferential distance from each circumferential end, each end rim having a plurality of notches consisting of one notch adjacent each pocket, the depths of said notches increasing from the circumferential center portion of the end rims to each circumferential end of the end rims.

* * * * *